United States Patent [19]

Kuhlthau

[11] 3,897,418

[45] July 29, 1975

[54] BASIC DYESTUFFS

[75] Inventor: Hans-Peter Kuhlthau, Leverkusen, Germany

[73] Assignee: Bayer Aktiengesellschaft, Leverkusen-Bayerwerk, Germany

[22] Filed: Mar. 9, 1973

[21] Appl. No.: 339,889

[30] Foreign Application Priority Data

Mar. 11, 1972 Germany............................ 2211958

[52] U.S. Cl. .................... 260/240 G; 8/12; 8/54.2; 8/177 R; 8/178 E; 8/178 R; 8/179; 106/22; 260/37 NP; 260/37 P; 260/326.11
[51] Int. Cl............................................ C09b 23/00
[58] Field of Search......... 260/240 G, 240.8, 326.16

[56] References Cited

UNITED STATES PATENTS

| 3,345,355 | 10/1967 | Raue.................................... 260/165 |
| 3,673,178 | 6/1972 | Tewksbury et al. .............. 260/240.8 |
| 3,759,902 | 9/1973 | Kuhlthau et al. ................. 260/240.8 |

FOREIGN PATENTS OR APPLICATIONS

| 1,214,896 | 11/1959 | France............................ 260/240 G |

OTHER PUBLICATIONS

Chemical Abstracts, Vol. 57, cols. 792 to 793 (1962), (abst. of Schroeder et al.).

Chemical Abstracts, Vol. 51, cols. 12065 to 12066 (1957), (abst. of Langenbeck et al.).

Chemical Abstracts, Sixth Collective Index, subjects A–Bi, p. 1582 (1964) "benzofuroindole".

Primary Examiner—John D. Randolph
Attorney, Agent, or Firm—Plumley & Tyner

[57] ABSTRACT

The present invention relates to basic dyestuffs with a dibenzofuran system, their mixtures, processes for their manufacture and their use for dyeing and printing of natural and synthetic materials; particularly of polyacrylonitrile and copolymers of acrylonitrile with other vinyl compounds, and acid modified aromatic polyesters and acid modified polyamides, leather, tanned cotton, cellulose, polyurethanes and for the production of writing liquids and stamping inks.

14 Claims, No Drawings

BASIC DYESTUFFS

The present invention relates to basic dyestuffs of the formula

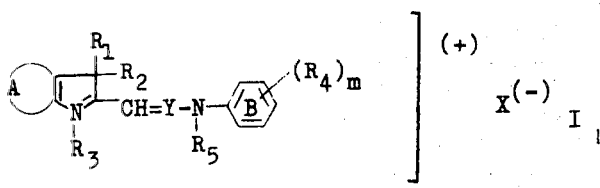

wherein
- A denotes the remaining members of a dibenzofurane system,
- $R_1$ denotes alkyl, aralkyl or cycloalkyl,
- $R_2$ denotes alkyl, aralykyl aralkyl cycloalkyl, it being possible for $R_1$ and $R_2$ to join together in a cycloalkyl ring,
- $R_3$ denotes hydrogen, alkyl, aryl or aralkyl,
- $R_4$ denotes a non-ionic substituent,
- $R_5$ denotes hydrogen or an alkyl radical which can form, with the o-position of the ring B, a ring which can be condensed with a further carbocyclic ring; cycloalkyl or aralkyl,
- Y denotes CH or N,
- $m$ denotes the numbers 0, 1 or 2 and
- $X^{(-)}$ denotes an anion.

Additionally, mixtures of the dyestuffs I, their manufacture and use for dyeing and printing natural and synthetic materials are a subject of this invention. The ring B can be fused to further rings. The cyclic and acyclic radicals can contain further non-ionic substituents and/or carboxyl groups.

Examples of suitable substituents of the ring system A are: halogen, nitro, alkyl with 1–4 C atoms, benzyl, phenethyl, hydroxyl, alkoxy with 1–4 C atoms, phenyloxy, benzyloxy or acyl with 1–3 C atoms in the alkyl radical.

Examples of suitable substituents of the ring B are: halogen, nitrile, nitro, alkyl with 1–4 C atoms, benzyl, phenethyl, cyclohexyl, hydroxyl, alkoxy or alkylthio with 1–12 C atoms, phenyloxy, phenylthio, benzyloxy, benzylthio, amino, alkylamino with 1–4 C atoms, acylamino with 1–3 C atoms in the alkyl radical, benzoylamino, carboxyl, alkoxycarbonyl with 1–4 C atoms in the alkyl radical, aminocarbonyl or aminosulphonyl.

An alkyl radical is understood as a saturated or unsaturated, optionally substituted, aliphatic hydrocarbon radical of, preferably, 1–6 C atoms, such as methyl, trifluoromethyl, ethyl, chloroethyl, bromoethyl, hydroxyethyl, methoxyethyl, cyanoethyl, acetoxyethyl, aminocarbonylethyl, i-propyl, n-butyl, i-butyl, t-butyl, i-amyl, allyl, methallyl, γ-chlorallyl or propargyl.

Examples of possible aralkyl radicals are: phenylmethyl, phenylethyl, phenylpropyl-(2,2) and optionally their derivatives substituted in the phenyl nucleus.

As cycloalkyl, cyclohexyl is of particular importance.

Aryl represents carbocyclic aromatic structures with 6–10 carbon atoms such as phenyl and naphthyl and their derivatives such as 4-methylphenyl, 2-methylphenyl, 4-chlorophenyl, 2-chlorophenyl and 2-methyl-4-chloro-phenyl.

Non-ionic substituents in the sense of the present invention are the non-dissociating substituents which are customary in dyestuff chemistry, such as fluorine, chlorine and bromine; alkyl groups, especially straight-chain or branched alkyl radicals with 1–6 C atoms; aralkyl radicals; alkenyl radicals; aryl radicals; alkoxy radicals, especially alkoxy radicals with 1–4 C atoms; aralkoxy radicals; aryloxy radicals and alkylthio radicals, preferably alkylthio radicals with 1–3 C atoms; aralkylthio radicals; arylthio radicals; nitro; nitrile; alkoxycarbonyl, preferably those having an alkoxy radical with 1–4 C atoms; the formyl radical; alkylcarbonyl radicals, especially those having an alkyl group with 1–4 C atoms; arylcarbonyl; aralkylcarbonyl radicals; alkoxycarbonyloxy radicals, preferably having an alkyl group with 1–4 C atoms; alkylcarbonylamino radicals, preferably having an alkyl group with 1–4 C atoms, and arylcarbonylamino radicals; alkylsulphonylamino radicals, preferably having an alkyl group with 1–3 C atoms; arylsulphonylamino groups, ureido; N-aryl- or N-alkyl-ureido, aryloxycarbonylamino and alkoxycarbonylamino; carbamoyl; N-alkyl-carbamoyl; N,N-dialkylcarbamoyl; N-alkyl-N-arylcarbamoyl; suulphamoyl; N-alkylsulphamoyl; N,N-dialkylsulphamoyl; alkylsulphonyl; alkenylsulphonyl; aralkylsulphonyl, with 1–4 C atoms preferably being present in the alkyl radicals mentioned; arylsulphonyl and carboxylic acid alkyl ester, carboxylic acid aryl ester, sulphonic acid alkyl ester and sulphonic acid aryl ester groups.

Possible anionic radicals $X^-$ are the organic and inorganic anions which are customary for cationic dyestuffs.

Examples of inorganic anions are fluoride, chloride, bromide and iodide, perchlorate, hydroxyl, and radicals of acids containing S, such as bisulphate, sulphate, disulphate and aminosulphate; radicals of nitrogen-oxygen acids, such as nitrate; radicals of oxygen acids of phosphorus such as dihydrogen-phosphate; hydrogen-phosphate, phosphate and metaphosphate; radicals of carbonic acid, such as bicarbonate and carbonate; further anions of oxygen acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the glycerine ester of boric acid and of esters of phosphoric acid, such as of methyl phosphate.

Examples of organic anions are anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, methylaminoacetic acid, aminoethyl-sulphonic acid, methylaminoethyl-sulphonic acid, propionic acid, n-butyric acid, i-butyric acid, 2-methyl-butyric acid, 2-ethyl-butyric acid, dichloracetic acid, trichloroacetic acid, trifluoracetic acid, 2-chloropropionic acid, 3-chloropropionic acid, 2-chlorobutyric acid, 2-hydroxypropionic acid, 3-hydroxypropionic acid, O-ethylglycollic acid, thioglycollic acid, glyceric acid, malic acid, dodecyltetraethyleneglycol-ether-propionic acid, 3-(nonyloxy)-propionic acid, 3-(isotridecyloxy)-propionic acid, 3-(isotridecyloxy)-diethyleneglycol-ether-propionic acid, the ether-propionic acid of the alcohol mixture with 6 to 10 carbon atoms, thioacetic acid, 6-benzoylamino-2-chlorocaproic acid, nonylphenoltetraethylene-glycol-ether-propionic acid, nonylphenoldiethylene-glycol-ether-propionic acid, dodecyltetraethyleneglycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 of SHELL), a mixture of aliphatic carboxylic acids with 15 to 19 carbon atoms (Versatic Acid 1519 of SHELL), coconut fatty acid first runnings, undecanecarboxylic acid, n-tridecanecarboxylic acid and a coconut fatty acid mixture; acrylic acid, methacrylic acid, crotonic acid, proparglyic acid, oxalic acid, malonic acid, succinic acid, glutaric acid, adipic acid, pimelic acid, suberic acid, azelaic acid, the isomer mixture of 2,2,4- and 2,4,4-trimethyladipic acid, sebacic acid, isosebacic acid (isomer mixture), tartaric acid, citric acid, glyoxylic acid, dimethyl-ether-α,α'-dicarboxylic acid, methylene-bis-thioglycollic acid, dimethylsulphide-α,α-dicarboxylic acid, 2,2'-dithio-di-n-propionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2-chloroethanesulphonic acid and 2-hydroxyethanesulphonic acid, and Mersolat, that is to say $C_{18}$-$C_{15}$-paraffinsulphonic acid obtained by chlorosulphonation of paraffin oil.

Suitable anions of cycloaliphatic carboxylic acids are, for example, the anions of cyclohexanecarboxylic acid and cyclohexene-3-carboxylic acid and anions of araliphatic monocarboxylic acids are, for example, anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitro-benzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthoic acid and anthraquinone-2-carboxylic acid.

Suitable anions of heterocyclic carboxylic acids are, for example, the anions of pyromucic acid, dehydromucic acid and indolyl-3-acetic acid.

Suitable anions of aromatic sulphonic acids are, for example, the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-ω-sulphonic acid, 2-chlorotoluene-4-sulphonic acid, 1-hydroxybenzenesulphonic acid, n-dodecylbenzenesulphonic acid, 1,2,3,4-tetrahydronaphthalene-6-sulphonic acid, naphthalene-1-sulphonic acid, naphthalene-1,4- or -1,5-disulphonic acid, naphthalene-1,3,5-trisulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

A suitable anion of heterocyclic sulphonic acids is, for example, the anion of quinoline-5-sulphonic acid.

Further possibilities are the anions of arylsulphinic, arylphosphonic and arylphosphonous acids, such as benzenesulphinic and benzenephosphonic acid.

Colourless anions are preferred. For dyeing from an aqueous medium, anions which increase the solubility of the dyestuff in water are preferred, for example the formate, acetate or lactate anion or an anion of an aliphatic dicarboxylic acid such as of succinic acid, glutaric acid, adipic acid, pimelic acid, suberic acid, maleic acid or itaconic acid. For dyeing from organic solvents, anions which assist the solubility of the dyestuff in organic solvents or at least do not influence it adversely are frequently also preferred.

The anion is generally determined by the manufacturing process and by the purification of the crude dyestuff which may have been carried out. In general, the dyestuffs are present as halides (especially as chlorides or bromides) or as methosulphates, ethosulphates, sulphates, benzenesulphonates or toluenesulphonates, or as acetates. A replacement of dyestuff anions by other dyestuff anions can be carried out by treating the basic dyestuff with acid-binding agents such as sodium carbonate, potassium carbonate, ammonium carbonate, magnesium carbonate, sodium hydroxide, potassium hydroxide, ammonia and silver oxide, optionally in an aqueous medium, whereupon the dyestuff-onium base (or the carbinol base) is produced, and treating the base with anion-donating agents.

Dyestuffs of the following general formulae, and their mixtures, are of interest:

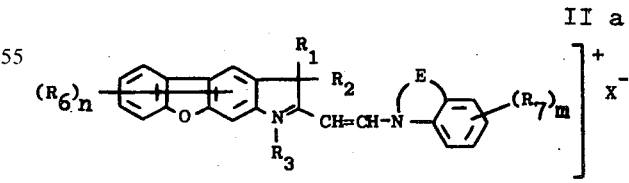

II a

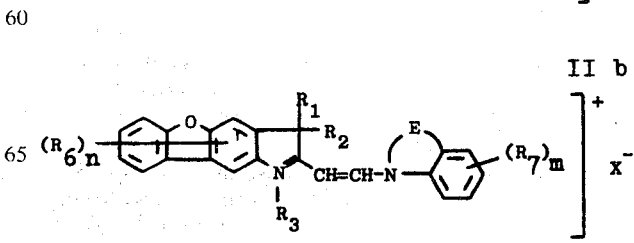

II b

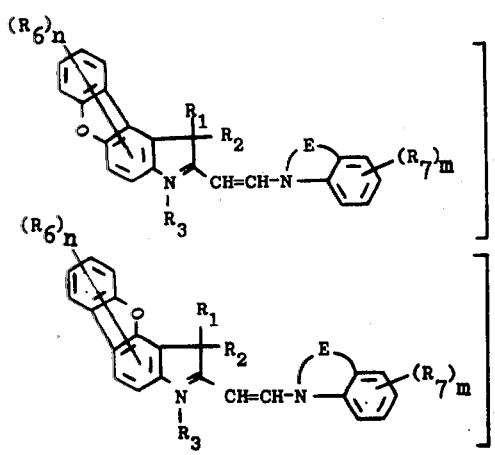

wherein

R₁, R₂, R₃, X⁽⁻⁾ and m have the abovementioned meaning and wherein

E denotes an alkylene radical with 2 or 3 C atoms,

R₆ denotes halogen, nitro, alkyl, aralkyl, hydroxy, alkoxy, aryloxy, aralkyloxy or acyl, R₇ denotes halogen, nitrile, alkyl, aralkyl, hydroxy, alkoxy, aryloxy, aralkyloxy, alkylthio, arylthio, aralkylthio, amino, acylamino, carboxy or alkoxycarbonyl and n denotes the numbers 0, 1 and 2.

Mixtures of IIb and IIc are preferred, and mixtures of IIa and IId are particularly preferred. At the same time, mixtures of the compounds IIa and IId in which $n = 0$ are of particular importance. The last-mentioned mixtures are particularly preferred if $R_1$ and $R_2$ are methyl groups and $R_3$ represents n-propyl, i-propyl, n-butyl, β-chloroethyl, β-hydroxyethyl, β-cyanoethyl, β-methoxyethyl, β-bromoethyl, allyl, β-acetoxyethyl or benzyl, but very particularly preferentially represents methyl or ethyl.

Dyestuffs and their mixtures of the following general formulae are also valuable:

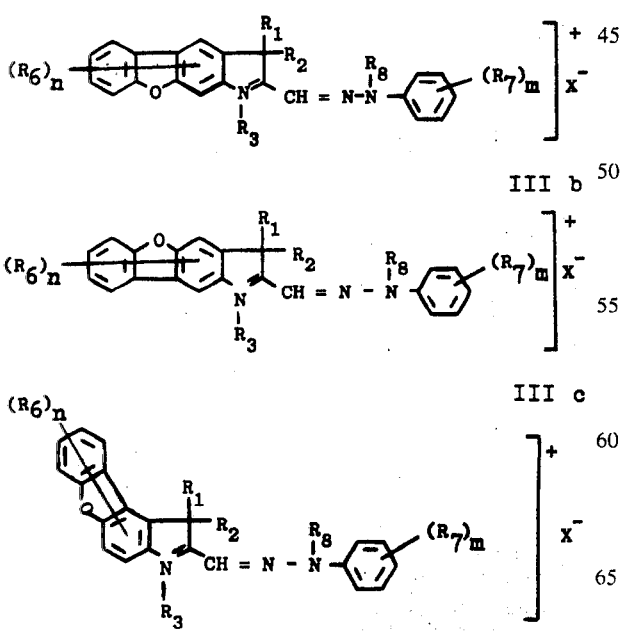

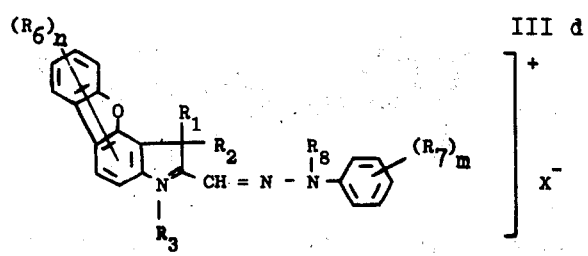

wherein

R₁, R₂, R₃, R₆, R₇X⁽⁻⁾, m and n have the abovementioned meaning and wherein

R₈ denotes hydrogen, alkyl with 1–4 C atoms, benzyl or phenylethyl.

Mixtures of IIIb and IIIc are preferred and mixtures of IIIa and IIId are particularly preferred. At the same time, mixtures of the compounds IIIa and IIId in which $n = 0$ are of particular importance. The last-mentioned mixtures are particularly preferred if $R_1$ and $R_2$ are methyl and $R_3$ represents n-propyl, i-propyl, n-butyl, β-chloroethyl, β-hydroxyethyl, β-cyanoethyl, β-methoxyethyl, β-bromoethyl, allyl, β-acetoxyethyl or benzyl, but very particularly preferentially represents methyl or ethyl, and if $R_8$ represents methyl or ethyl.

The dyestuffs of the formula I and their mixtures are manufactured, in the case that $Y = CH$, by condensation of aldehydes or their functional derivatives of the formula

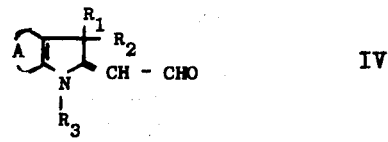

with amines of the formula

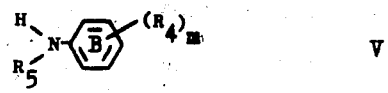

in a manner which is in itself known.

In the formulae IV and V, $R_1$, $R_2$, $R_3$, $R_4$, $R_5$, A and m have the meaning indicated for the formula I.

Examples of suitable functional aldehyde derivatives are azomethines and their salts, hydrazones, oximes, acetals, hydrates, ammoniates, aminals or bisulphite adducts.

The condensation can be carried out by stirring the solution or suspension of equimolar amounts of the compound IV and V in an organic or inorganic acid or their mixtures with water at 10°–120°C, preferably at 20°–60°C. Dilute aqueous mineral acids such as sulphuric acid, phosphoric acid or hydrochloric acid, for example, are suitable. Lower fatty acids such as formic acid, acetic acid, propionic acid, butyric acid, lactic acid and their mixtures with water are also suitable.

The condensation can also be carried out in an inert solvent such as, say, acetonitrile, methanol, ethanol, isopropanol, toluene or chlorobenzene in the presence of acid condensation agents such as, say, phosphorus oxychloride, phosphorus pentoxide, zinc chloride, aluminum chloride, tin chloride, sulphuric acid, phosphoric acid or polyphosphoric acid.

A particular embodiment of the process according to the invention is characterised in that aldehydes of the formula IV, in the form of their enamines as first produced in the Vilsmeier reaction, of the formula

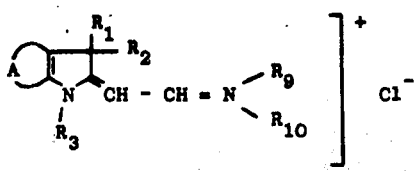

wherein
R₁, R₂, R₃ and A have the meaning indicated for formula I and
R₉ represents $C_1$-$C_4$-alkyl or phenyl and
R₁₀ represents $C_1$-$C_4$-alkyl
are employed.

Examples of suitable aldehydes of the formula IV are:

1. Mixtures of the substances:

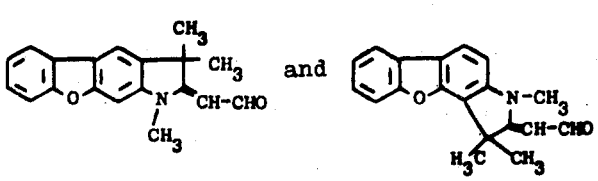

2. Mixtures of the substances:

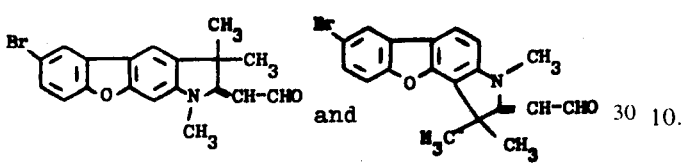

3. Mixtures of the substances:

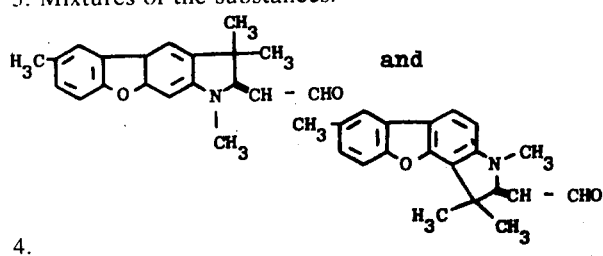

4.

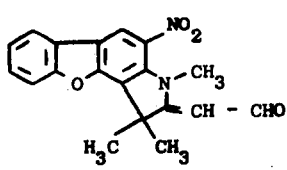

5. Mixtures of the substances:

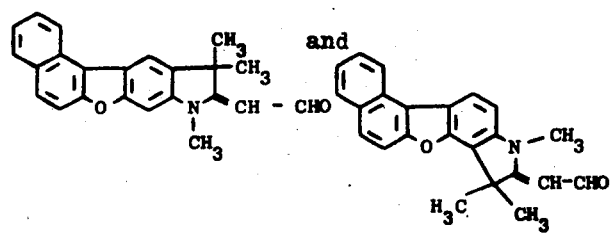

6.

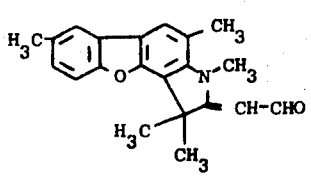

7. Mixtures of the substances:

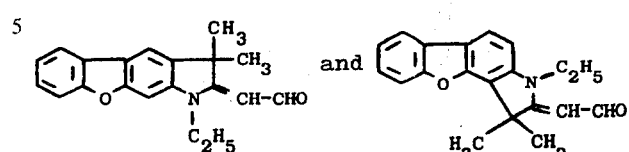

8. Mixtures of the substances:

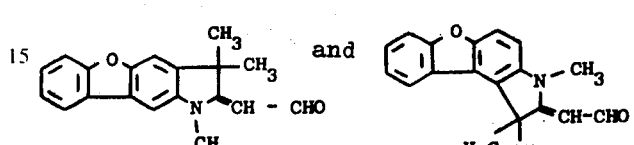

9.

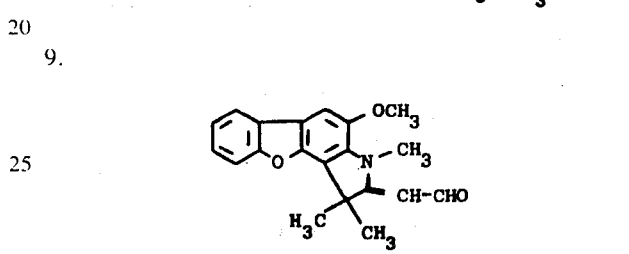

10.      11.

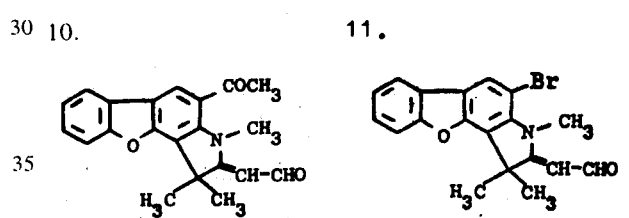

As examples of amine components of the formula V there may be mentioned: 4-aminodiphenyl-ether, 4-amino-4'-methyl-diphenyl-ether, 4-amino-4'-ethyldiphenyl-ether, 4-amino-4'-tertiary-butyldiphenyl-ether, 4-amino-4'-cyclohexyldiphenyl-ether, 4-amino-2'-methyldiphenyl-ether, 4-amino-3'-methyldiphenyl-ether, 4-amino-4'-methoxy-diphenyl-ether, 4-amino-3'-methoxy-diphenyl-ether, 4-amino-4'-ethoxy-diphenylether, 4-amino-4'-4'-acetylamino-diphenyl-ether, 4-amino-4'-hydroxy-diphenyl-ether, 4-amino-4'-nitrodiphenyl-ether, 4-amino-4'-chlorodiphenyl-ether, 4-amino-2'-chlorodiphenyl-ether, 4-amino-3'-chlorodiphenyl-ether, 4-amino-phenyl-α-naphthylether, 4-aminophenyl-β-naphthyl-ether, 4-amino-2',3',5'-trimethyldiphenyl-ether, 4-aminophenylbenzyl-ether, 3-aminophenylbenzyl-ether, 2-amino-phenylbenzyl-ether, 2-aminodiphenyl-ether, 4-aminophenyl-p-methylbenzyl-ether, 4-aminophenyl-p-chlorobenzyl-ether, 4-aminophenyl-o-chlorobenzyl-ether, 4-aminophenyl-m,p-dichlorobenzyl-ether, 4-aminobenzyl-2',4',5'-trichlorobenzyl-ether, 3-aminophenyl-p-methylbenzyl-ether, 3-aminophenyl-p-chlorobenzyl-ether, 3-aminophenyl-o-chlorobenzyl-ether, 3-aminophenyl-m,p-dichlorobenzyl-ether, 3-aminophenyl-2',4',5'-trichlorobenzyl-ether, 2-aminophenyl-p-methylbenzyl-ether, 2-aminophenyl-p-chlorobenzyl-ether, 2-aminophenyl-m,p-dichlorobenzyl-ether, 2-aminophenyl-2',4',5'-trichlorobenzyl-ether, 4-amino- 2-methylphenyl-benzyl-ether, 5-amino-2-methyl-phenyl-benzyl-ether, 2-amino-5-methyl-phenyl-benzyl-ether, 4-amino-2-methoxy-phenylbenzyl-ether, 4-amino-3-methoxy-phenyl-benzyl-ether, 4-amino-3-methyl-phenyl-benzyl-ether, 4-amino-3-chloro-phenyl-benzylether, 4-amino-2-chloro-phenyl-benzyl-ether, 4-amino-2-methylphenyl-p-methylbenzyl-ether, 5-amino-2-methyl-phenyl-m,p-dichlorobenzyl-ether, 2-amino-5-methyl-phenyl-p-chlorobenzylether, 4-amino-2-methoxy-phenyl-p-methylbenzyl-ether, 4-amino-3-methyl-phenyl-2',4',5'-trichlorobenzyl-ether, aniline, p-toluidine, m-toluidine, o-anisidine, m-anisidine, p-anisidine, p-phenetidine, o-phenetidine, 4-dodecyloxyaniline, 4-aminoacetanilide, N-benzoyl-p-phenylenediamine, 2,4-dimethoxyaniline, 2,5-dimethoxyaniline, 3,4-dimethoxyaniline, 2-chloro-4-amino-anisole, 2,4,5-trimethylaniline, 2,3,5-trimethylaniline, 5-amino-2-acetylaminoanisole, 6-amino-3-methoxy-toluene, 3,4-dicyanoaniline, p-sulphanilic acid amide, 4-aminobenzamide, 4-chloroaniline, 4-fluoroaniline, 1,2,3,4-tetrahydro-5-amino-naphthalene, 4-amino-2,5-diethoxy-benzoic acid anilide, 4-amino-2-methyl-5-methoxybenzanilide, 4-cyclohexylaniline, 2,4-diethoxyaniline, 2-aminonaphthalene, 2-methyl-2,3-dihydroindole, hexahydrocarbazole, 1,2,3,4-tetrahydroquinoline, 1,2,3,4-tetrahydro-6-methoxyquinoline, 4-methylamino-phenylbenzyl-ether, 4-ethylamino-phenylbenzylether, 2,2,-4-trimethyl-1,2,3,4-tetrahydroquinoline, 1,2,3,4-tetrahydroquinoxaline, 2,5,6-trimethylindoline, 5-chloroindoline, 2-methyl-5-bromoindoline, 5-methoxyindoline, 5-ethoxyindoline, 2,3-dihydro-4H-benzoxazine-(1,4), 2,3,3-trimethyl-5-methoxy-indoline, 2,3,3-trimethyl-5-benzyloxyindoline, 2-methyl-5-methoxyindoline, 2,3,3-trimethyl-5-ethoxyindoline and 2,3,3-trimethyl-5-phenoxyindoline.

A further process consists of condensing the N-formyl derivatives of the formula

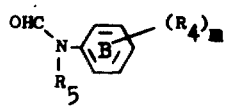  VII wherein
$R_4$, $R_5$ and $m$ have the meaning indicated for formula with methyleneindolines of the formula

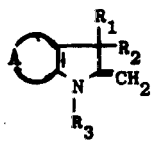  VIII wherein
$R_1$, $R_2$, $R_3$ and A have the meaning indicated for the formula (I)
under acid conditions.

For example, the procedure followed is to heat a component of the formula (V) and formic acid to the boil in an inert water-immiscible solvent, such as benzene, toluene or chlorobenzene until the water formed has been separated off azeotropically, mix the resulting solution of a compound of the formula (VII) with the equivalent amount of an indolinemethylene compound of the formula (VIII), add an acid condensation agent such as phosphorus oxychloride, phosphorus pentoxide, polyphosphoric acid or sulphuric acid and carry out the condensation in the temperature range of 20° to 100°C.

Dyestuffs of the formula I and their mixtures in which
$Y = N$ and
$R_5$ is not cyclised
are manufactured by protonising or quaternising azo bases or their mixtures, of the formula

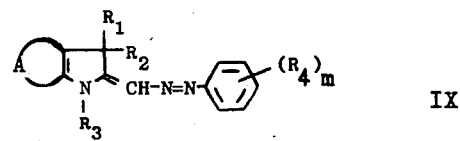  IX wherein
$R_1$, $R_2$, $R_3$, $R_4$, $n$ and A have the same meaning as in the formula I
with compounds $R'_5$-X
wherein
$R'_5$ denotes hydrogen, alkyl, cycloalkyl or aralkyl and
X is a radical which can be split off as an anion.

Azo bases of the formula IX can be manufactured by diazotising, in a manner which is in itself known, amines of the formula

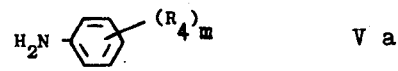  V a wherein
$R_4$ and $m$ have the meaning mentioned for formula I
and coupling with compounds of the formula VIII, and treating the resulting coupling products with alkali in a manner which is in itself known.

The coupling products of the formula IX and their mixtures have the following formula in an acid medium

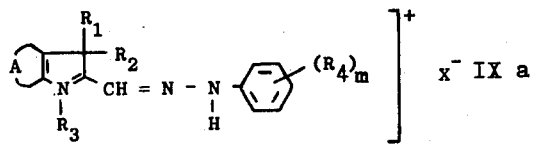  IX a

The alkylation can be carried out by warming the sollution or suspension of a compound of the formula IX in an inert medium with the alkylating agent to 60–150°C, preferably 80°–120°C. For this purpose, an excess of the alkylating agent can also be used as the solvent.

Suitable inert media are, for example, organic liquids such as benzine, ligroin, cyclohexane, benzene, toluene, chloroform, chlorobenzene and dichlorobenzene, nitrobenzene, tetralin, dioxane, acetonitrile and dimethylformamide.

Suitable alkylating agents are, for example, dimethyl sulphate, diethyl sulphate, di-n-butyl sulphate, di-isoamyl sulphate, dimethyl pyrosulphate, benzenesulphonic acid methyl, ethyl, n-propyl, iso-propyl and iso-butyl ester, toluenesulphonic acid methyl, ethyl, n-propyl, iso-propyl and isobutyl ester, mthyl iodide, ethyl iodide, n-butyl bromide, allyl bromide, 2-chloro- and 2-bromo-diethyl-ether as well as chloroacetic and bromoacetic acid esters such as chloroacetic and bromoacetic acid ethyl esters.

The alkylation can also be carried out in the presence of alkaline agents, especially in the presence of tertiary amines, which have a bulky substituent at the N-atom, in accordance with Belgian Patent Specification No. 735,565. Triisopropanolamine is particularly suitable as an amine with bulky substitution.

Suitable amine compounds of the formula Va are amines of the formula V in which $R_5$ denotes a hydrogen atom.

Suitable methylene compounds of the formula VIII have already been listed above in the form of their ω-aldehydes of the general formula IV.

Dyestuffs of the formula I and their mixtures, in which Y = N can also be obtained by reaction of compounds, or their mixtures, of the formula

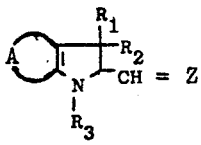   X wherein
A, $R_1$, $R_2$ and $R_3$ have the same meaning as in the formula I and
Z denotes oxygen or a a functional derivative of the aldehyde group
with compounds of the formula

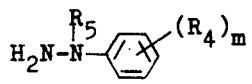   XI wherein
$R_4$, $R_5$ and $m$ have the same meaning as in the formula I.

The new dyestuffs and their mixtures of the formula I are valuable dyestuffs which can be used for dyeing and printing materials of leather, tannin-treated cotton, cellulose, synthetic polyamides and polyurethanes, and for dyeing fibres containing lignin, such as coir, jute and sisal. They are furthermore suitable for the manufacture of writing fluids, rubber-stamp inks and ball pen pastes and can also be used in flexographic printing.

Flocks, fibres, filaments, tapes, woven fabrics or knitted fabrics of polyacrylonitrile or of copolymers of acrylonitrile with other vinyl compounds such as vinyl chloride, vinylidene chloride, vinyl fluoride, vinyl acetate, vinylpyridine, vinylimidazole vinyl alcohol, acrylic and methacrylic acid esters and amides and asymmetrical dicyanoethylene, or flocks, fibres, filaments, tapes, woven fabrics or knitted fabrics of acid-modified aromatic polyesters and acid-modified polyamide fibres are particularly suitable for dyeing with the basic dyestuffs, and their mixtures, of the formula I. Acid-modified aromatic polyesters are, for example, polycondensation products of sulphoterephathalic acid and ethylene glycol, that is to say polyethyleneglycolterephthalates containing sulphonic acid groups (type Dacron 64 of E. I. DuPont de Nemours and Company) such as are described in Belgian patent specification. No. 549,179 and U.S. Pat. No. 2,893,816.

Dyeing can also be effected from a weakly acid liquor, with the material appropriately being introduced into the dyebath at 40°–60°C and then dyed at the boil. It is also possible to dye under pressure at temperatures above 100°C. Furthermore, the dyestuffs can be added to spinning solutions for the manufacture of fibres containing polyacrylonitrile or be applied to the unstretched fibre. The greenish-tinged yellow to orange-coloured dyeings on polyacrylonitrile, acid-modified polyesters and acid-modified polyamide are distinguished by very good fastness to light, wet processing, rubbing and sublimation and by a high affinity to the fibre. The fibres form light-fast pigments which anionic precipitants such as alumina, tannin, phosphotungstic acids and phosphomolybdic acids, and these pigments can advantageously be employed in paper printing.

The dyestuffs can be used individually or as mixtures.

The dyestuffs according to the invention and their mixtures are very suitable for dyeing shaped articles of polymers or copolymers of acrylonitrile, asymmetrical dicyanoethylene, acid-modified aromatic polyesters or acidmodified synthetic polyamides in chlorinated hydrocarbons as the dyebath, if they carry substituents which assist the solubility in chlorinated hydrocarbons, such as, for example, the tertiary butyl group or the dodecyloxy group, or if the anion $X^-$ is the anion of a monobasic organic acid with 4–30 carbon atoms.

Stable concentrated solutions of these dyestuffs in chlorinated hydrocarbons can in particular then be manufactured, optionally with addition of polar organic solvents which are completely miscible with chlorinated hydrocarbons, such as butyrolactone, dimethylformamide, methanol, dioxane, acetonitrle, methyl ethyl ketone, nitrobenzene, dimethylsulphoxide, benzonitrile and 2-nitrochlorobenzene, if the dyestuffs according to the invention are in the form of salts of the monobasic organic acids with 4–30 carbon atoms which have been mentioned.

To manufacture such solutions, the dyestuffs according to the invention, or their mixtures (in the form of the free bases or as salts of organic acids with 4–30 carbon atoms) are stirred with chlorinated hydrocarbons and monobasic organic acids with 4–30 carbon atoms, optionally with the addition of polar organic solvents which are completely miscible with chlorinated hydrocarbons, and optionally at an elevated temperature.

EXAMPLE 1

29.1 parts by weight of an aldehyde mixture XII which consists of the components

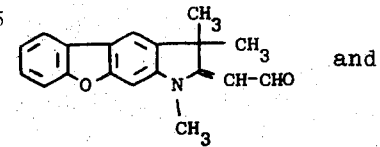 and

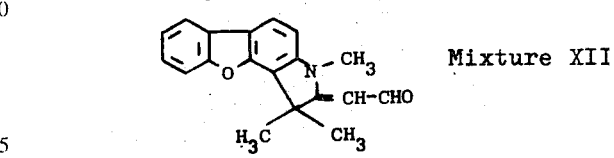   Mixture XII as obtained according to Example 227, and 13.3 parts by weight of 2-methyl-2,3-dihydroindole are stirred with 60 parts by volume of glacial acetic acid and 15 parts by volume of water for 4 hours at room temperature and then diluted with 1,000 parts by volume of water. The resulting dyestuff mixture is salted-out with 50 parts by weight of sodium chloride, separated from the solution, re-dissolved in 1,500 parts by volume of water, again salted-out with sodium chloride, separated off and dried.

It consists to the extent of about 44 percent of the component of the formula

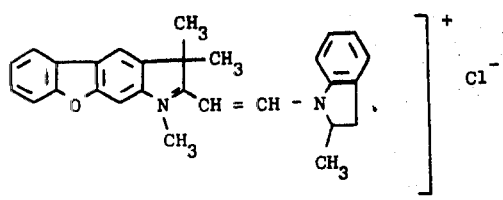

and to the extent of about 56 percent of the component of the formula

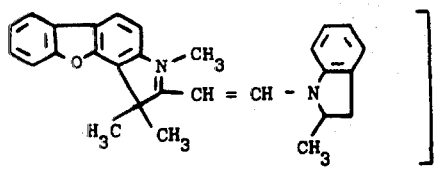

and dyes materials of polyacrylonitrile, acid-modified polyesters and acid-modified polyamide in greenish-tinged yellow shades of excellent fastness to light and to wet processing.

EXAMPLE 2

If, in Example 1, an aldehyde mixture XIII of the components

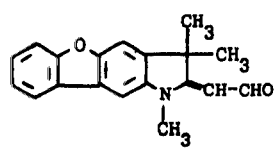

and 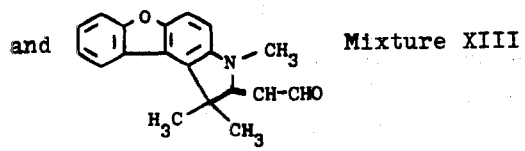 Mixture XIII is employed, which is obtained according to Example 227 if instead of 3-aminobenzofurane 2-aminobenzofurane is reacted, and in other respects the instructions in Example 1 are followed, a mixture is obtained which consists to the extent of about 73 percent of the dyestuff

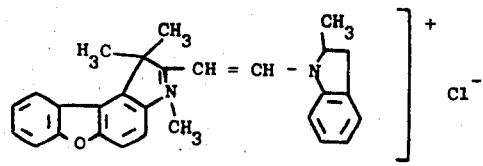

and to the extent of about 27 percent of the dyestuff

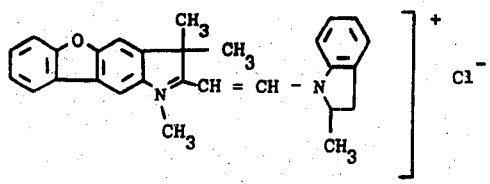

It has similarly good dyeing properties to the dyestuff mixture described in Example 1.

Analogously, the following valuable dyestuff mixtures are obtained on using other amines than 2-methylindoline for the condensation with the above-mentioned aldehyde mixtures XII and XIII:

| Example No. | Aldehyde Mixture No. | Amine | Colour Shade on Polyacrylonitrile |
|---|---|---|---|
| 3 | XII | 2,3,3-Trimethyl-5-methoxyindoline | greenish-tinged yellow |
| 4 | XIII | " | " |
| 5 | XII | 2,3,3-Trimethyl-5-ethoxyindoline | " |
| 6 | XIII | " | " |
| 7 | XII | 2,3,3-Trimethyl-5-benzyloxyindoline | " |
| 8 | XIII | " | " |
| 9 | XII | 2,3,3-Trimethyl-5-phenoxyindoline | " |
| 10 | XIII | " | " |
| 11 | XII | 1,2,3,4a,9a-Hexahydrocarbazole | " |
| 12 | XIII | " | " |
| 13 | XII | 1,2,3,4,4a,9a-Hexahydro-6-methoxycarbazole | " |
| 14 | XIII | " | " |
| 15 | XII | 1,2,3,4-Tetrahydro-6-methoxyquinoline | " |
| 16 | XIII | " | " |
| 17 | XII | 5-Methoxyindoline | " |
| 18 | " | 5-Ethoxyindoline | " |
| 19 | " | 1,2,3,4-Tetrahydroquinoxaline | " |
| 20 | " | 6,7-Dimethyl-2,3-dihydro-4-H-benzoxazine (1.4) | " |
| 21 | " | 2,2,4-Trimethyl-1,2,3,4-tetrahydroquinoline | " |
| 22 | " | 1,2,3,4-Tetrahydro-6-ethoxyquinoline | " |
| 23 | XIII | | " |

Continued

| Example No. | Aldehyde Mixture No. | Amine | Colour Shade on Polyacrylonitrile |
|---|---|---|---|
| 24 | XII | 1,2,3,4-Tetrahydro-6-methoxyquinoxaline | " |
| 25 | " | 1,2,3,4-Tetrahydroquinoline | " |
| 26 | " | Aniline | " |
| 27 | XII | 4-Amino-phenyl-benzyl-ether | " |
| 28 | XIII | " | " |
| 29 | XII | 3-Amino-phenyl-benzyl-ether | " |
| 30 | " | 2-Amino-phenyl-benzyl-ether | " |
| 31 | XII | 4-Aminophenyl-p-methylbenzyl-ether | " |
| 32 | " | 4-Aminophenyl-p-chlorobenzyl-ether | " |
| 33 | " | 4-Aminophenyl-p-chloro-benzyl-ether | " |
| 34 | " | 4-Aminophenyl-m,p-dichloro-benzyl-ether | " |
| 35 | " | 3-Aminophenyl-p-methyl-benzyl-ether | " |
| 36 | " | 3-Aminophenyl-p-chloro-benzyl-ether | " |
| 37 | " | 3-Aminophenyl-o-chloro-benzyl-ether | " |
| 38 | " | 3-Aminophenyl-m,p-dichloro-benzyl-ether | " |
| 39 | " | 2-Aminophenyl-p-methyl-benzyl-ether | yellow |
| 40 | " | 2-Aminophenyl-p-chloro-benzyl-ether | " |
| 41 | " | 2-Aminophenyl-m,p-dichloro-benzyl-ether | " |
| 42 | " | 4-Amino-2-methylphenyl-benzyl-ether | " |
| 43 | " | 5-Amino-2-methylphenyl-benzyl-ether | " |
| 44 | " | 2-Amino-5-methylphenyl-benzyl-ether | " |
| 45 | " | 4-Amino-2-methoxy-phenyl-benzyl-ether | reddish-tinged yellow |
| 46 | " | 4-Amino-3-methoxy-phenyl-benzyl-ether | yellow |
| 47 | " | 4-Amino-3-methylphenyl-benzyl-ether | " |
| 48 | " | 4-Amino-3-chloro-phenyl-benzyl-ether | " |
| 49 | " | 4-Amino-2-chloro-phenyl-benzyl-ether | " |
| 50 | " | 4-Amino-2-methyl-phenyl-p-methyl-benzyl-ether | " |
| 51 | " | 5-Amino-2-methyl-phenyl-m,p-dichloro-benzyl-ether | " |
| 52 | " | 4-Amino-2-methoxy-phenyl-p-methyl-benzyl-ether | reddish-tinged yellow |
| 53 | " | 2-Amino-5-methyl-phenyl-p-chloro-benzyl-ether | yellow |
| 54 | " | 4-Methylamino-phenyl-benzyl-ether | " |
| 55 | " | 4-Ethylamino-phenyl-benzyl-ether | " |
| 56 | " | 2-Aminodiphenyl-ether | " |
| 57 | " | 4-Aminodiphenyl-ether | " |
| 58 | " | 4-Amino-4'-methyl-diphenyl-ether | greenish-tinged yellow |
| 59 | " | 4-Amino-4'-ethyl-diphenyl-ether | " |
| 60 | " | 4-Amino-4'-tertiary-butyl-diphenyl-ether | " |
| 61 | " | 4-Amino-4'-cyclohexyl-diphenyl-ether | yellow |
| 62 | " | 4-Amino-2'-methyl-diphenyl-ether | " |
| 63 | " | 4-Amino-3'-methyl-diphenyl-ether | " |
| 64 | " | 4-Amino-4'-methoxy-diphenyl-ether | greenish-tinged yellow |
| 65 | " | 4-Amino-3'-methoxy-diphenyl-ether | yellow |
| 66 | " | 4-Amino-4'-ethoxy-diphenyl-ether | " |
| 67 | " | 4-Amino-4'-acetylamino-diphenyl-ether | " |
| 68 | " | 4-Amino-4'-hydroxy-diphenyl-ether | " |
| 69 | " | 4-Amino-4'-nitro-diphenyl-ether | reddish-tinged yellow |
| 70 | " | 4-Amino-4'-chloro-diphenyl-ether | greenish-tinged yellow |
| 71 | " | 4-Amino-2'-chloro-diphenyl-ether | yellow |
| 72 | " | 4-Amino-3'-chloro-diphenyl-ether | " |
| 73 | " | 4-Aminophenyl-α-naphthyl-ether | greenish-tinged yellow |
| 74 | " | 4-Aminophenyl-β-naphthyl-ether | " |
| 75 | " | 4-Amino-2',3',5'-trimethyl-diphenyl-ether | yellow |
| 76 | XIII | 4-Amino-4'-ethyl-diphenyl-ether | greenish-tinged yellow |
| 77 | " | 4-Amino-4'-tert.-butyl-diphenyl-ether | " |
| 78 | " | 4-Amino-4'-methoxy-diphenyl-ether | greenish-tinged yellow |
| 79 | XII | 4-Aminodiphenyl-α-naphthyl-ether | " |
| 80 | " | 4-Amino-phenyl-4'-methyl-diphenyl-ether | " |
| 81 | " | 4-Amino-phenyl-4'-methoxy-diphenyl-ether | " |
| 82 | XIII | 4-Amino-phenyl-α-naphthyl-ether | " |
| 83 | XII | p-Toluidine | " |
| 84 | " | m-Toluidine | " |
| 85 | " | o-Anisidine | yellow |
| 86 | " | m-Anisidine | greenish-tinged yellow |
| 87 | " | p-Anisidine | " |
| 88 | " | o-Phenetidine | yellow |
| 89 | " | p-Phenetidine | greenish-tinged yellow |
| 90 | " | 4-Dodecyloxyaniline | yellow |
| 91 | " | 4-Aminoacetanilide | greenish-tinged yellow |
| 92 | " | N-Benzoyl-p-phenylenediamine | " |
| 93 | " | 2,4-Dimethoxyaniline | reddish-tinged yellow |
| 94 | " | 2,5-Dimethoxyaniline | " |
| 95 | " | 3,4-Dimethoxyaniline | golden yellow |
| 96 | " | 3,4-Diisopropoxyaniline | " |
| 97 | " | 2-Chloro-4-aminoanisole | reddish-tinged yellow |
| 98 | " | 2,4,5-Trimethylaniline | greenish-tinged yellow |
| 99 | " | 2,3,5-Trimethylaniline | " |
| 100 | " | 5-Amino-2-acetylaminoanisole | reddish-tinged yellow |
| 101 | " | 6-Amino-3-methoxy-toluene | yellow |
| 102 | " | 3,4-Dicyanoaniline | " |
| 103 | " | p-Sulphanilic acid amide | " |
| 104 | " | 4-Chloroaniline | " |
| 105 | " | 4-Fluoroaniline | greenish-tinged yellow |
| 106 | " | 1,2,3,4-Tetrahydro-5-amino-naphthalene | yellow |
| 107 | " | 4-Amino-2,5-diethoxybenzoic acid anilide | yellowish-tinged orange |
| 108 | " | 4-Amino-2-methyl-5-methoxy-benzanilide | reddish-tinged yellow |
| 109 | " | 4-Aminobenzamide | yellow |

Continued

| Example No. | Aldehyde Mixture No. | Amine | Colour Shade on Polyacrylonitrile |
|---|---|---|---|
| 110 | " | 4-Cyclohexylaniline | yellow |
| 111 | " | 2,4-Diethoxyaniline | reddish-tinged yellow |
| 112 | " | 2-Aminonaphthalene | yellow |
| 113 | " | p-tert.-Butylaniline | greenish-tinged yellow |
| 114 | " | p-n-Propoxyaniline | " |
| 115 | " | p-n-Butoxyaniline | " |
| 116 | " | p-i-Propoxyaniline | " |
| 117 | XIII | p-Toluidine | " |
| 118 | " | p-tert.-Butylaniline | " |
| 119 | " | p-Anisidine | " |

On using the appropriate startingg products and employing the procedure indicated in Example 1, the following dyestuffs are obtained:

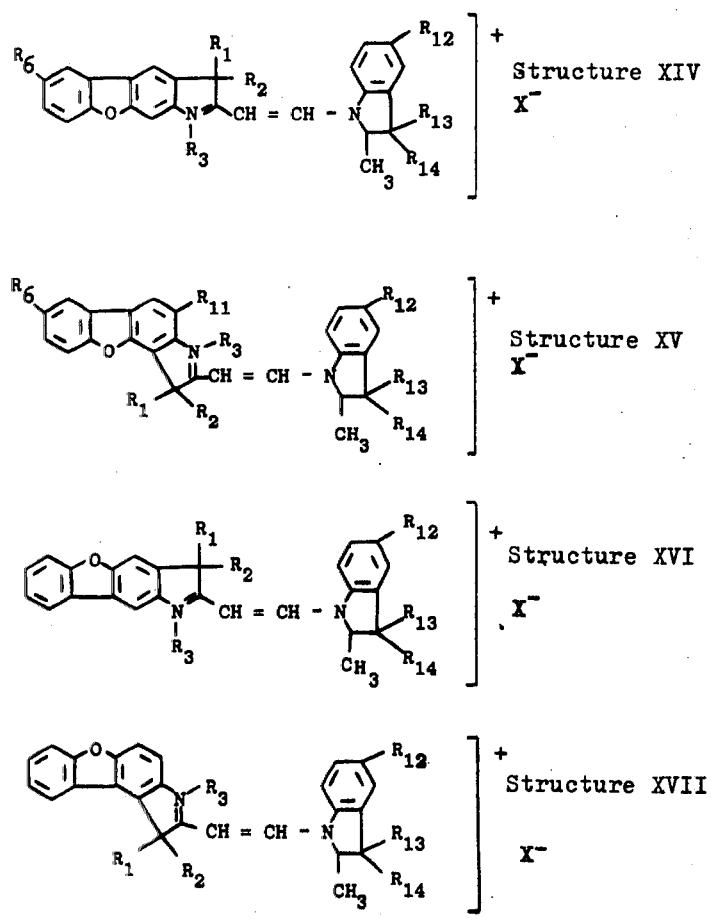

| Example No. | Structure | $R_1$ | $R_2$ | $R_3$ | $R_6$ | $R_{11}$ | $R_{12}$ | $R_{13}$ | $R_{14}$ | Colour Shade on Polyacrylonitrile |
|---|---|---|---|---|---|---|---|---|---|---|
| 120 | Mixture of XIV and XV | $CH_3$ $CH_3$ | $CH_3$ $CH_3$ | $C_2H_5$ $C_2H_5$ | H H | — H | H H | H H | H H | greenish-tinged yellow |
| 121 | Mixture of XIV and XV | $CH_3$ $CH_3$ | $CH_3$ $CH_3$ | $C_2H_5$ $C_2H_5$ | H H | — H | $OCH_3$ $OCH_3$ | $CH_3$ $CH_3$ | $CH_3$ $CH_3$ | " |
| 122 | Mixture of XIV and XV | $CH_3$ $CH_3$ | $CH_3$ $CH_3$ | $CH_3$ $CH_3$ | Br Br | — H | H H | H H | H H | " |
| 123 | Mixture of XVI and XVII | $CH_3$ $CH_3$ | $CH_3$ $CH_3$ | $C_2H_5$ $C_2H_5$ | — — | — — | H H | H H | H H | " |
| 124 | Mixture of XVI and XVII | $CH_3$ $CH_3$ | $CH_3$ $CH_3$ | $C_2H_5$ $C_2H_5$ | — — | — — | $OCH_3$ $OCH_3$ | $CH_3$ $CH_3$ | $CH_3$ $CH_3$ | " |

Continued

| Example No. | Structure | $R_1$ | $R_2$ | $R_3$ | $R_6$ | $R_{11}$ | $R_{12}$ | $R_{13}$ | $R_{14}$ | Colour Shade on Polyacrylonitrile |
|---|---|---|---|---|---|---|---|---|---|---|
| 125 | XV | $CH_3$ | $CH_3$ | $CH_3$ | $CH_3$ | $CH_3$ | H | H | H | '' |
| 126 | XV | $CH_3$ | $CH_3$ | $CH_3$ | H | $OCH_3$ | H | H | H | '' |
| 127 | XV | $CH_3$ | $CH_3$ | $CH_3$ | H | $COCH_3$ | H | H | H | '' |
| 128 | Mixture of XIV and XV | $CH_3$ $CH_3$ | $CH_3$ $CH_3$ | $CH_3$ $CH_3$ | $CH_3$ $CH_3$ | — H | H H | H H | H H | '' |
| 129 | Mixture of XIV and XV | $C_2H_5$ $C_2H_5$ | $C_2H_5$ $C_2H_5$ | $C_2H_5$ $C_2H_5$ | H H | — H | H H | H H | H H | '' |
| 130 | Mixture of XIV and XV | $CH_3$ | $CH_3$ | Benzyl | H | H | H | H | H | '' |
| 131 | Mixture of XIV and XV | $CH_3$ | $CH_3$ | $-CH_2-CH-CH_2$ | H | H | H | H | H | '' |
| 132 | Mixture of XIV and XV | $CH_3$ | $CH_3$ | $-CH_2-CH_2-CN$ | H | H | H | H | H | '' |
| 133 | Mixture of XIV and XV | $CH_3$ | $CH_3$ | $-CH_2-CH_2-Cl$ | H | H | H | H | H | '' |
| 134 | XV | $CH_3$ | $CH_3$ | $CH_3$ | H | Br | H | H | H | yellow |
| 135 | Mixture of XIV and XV | $CH_3$ | $CH_3$ | n—$C_4H_9$ | H | H | H | H | H | greenish-tinged yellow |

EXAMPLE 136

22.5 parts by weight of a mixture XVIII of indolinemethylene bases of which the components have the formulae

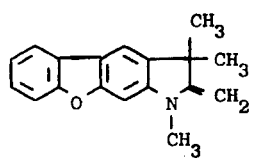

and 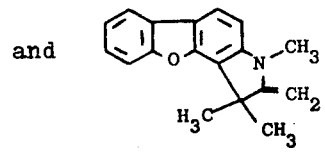   Mixture XVIII are dissolved in 50 parts by volume of acetonitrile.

The mixture of the indolines was manufactured according to Example 227.

At the same time, 10.5 parts by weight of p-anisidine in 300 parts by volume of water are diazotised with a solution of 5.9 g of sodium nitrite in 25 parts by volume of water in the presence of 30.9 parts by weight of 30 percent strength hydrochloric acid. The excess nitrite is destroyed with amidosulphonic acid, 0.5 parts by weight of an emulsifier is added and the above solution is allowed to run into acetonitrile at 5°. 75 parts by volume of a 20 percent strength sodium acetate solution are then added dropwise over the course of 3 hours and at the same time the temperature is raised to 10°C. Finally, the temperature is allowed to rise to 18°–20°C and the coupling product is then salted-out. It is filtered off in the form of a red powder and is then introduced at 80°C into a stirred mixture of 200 parts by volume of chlorobenzene and 200 parts by volume of water, whilst at the same time keeping the pH-value of the aqueous layer at 9–10 by dropwise addition of sodium hydroxide solution. The mixture is stirred for a further 30 minutes, the organic layer is separated off, 3.3 parts by weight of triisopropanolamine are added and the chlorobenzene is dehydrated by distilling off about 30 ml of liquid under reduced pressure at approx. 80°C. 14 parts by weight of dimethylsulphate are then added dropwise at 80°C and stirring is continued until the methylation is complete, which can be followed by thin layer chromatography. On cooling, the dyestuff mixture crystallises out.

Its components correspond to the formulae

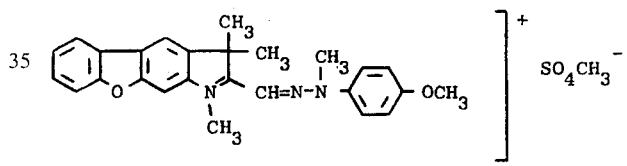

and

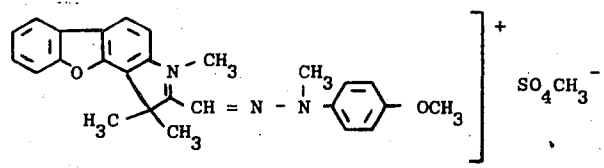

The mixture can be isolated by filtering with chlorobenzene solution or, after steam-stripping the chlorobenzene, by filtration of the aqueous distillation residue.

The mixture dyes materials of polyacrylonitrile in orange-coloured shades of excellent fastness to light and to wet processing.

Instead of dimethyl sulphate it is possible to use, for example, diethyl sulphate or p-toluenesulphonic acid methyl ester with equally good result.

EXAMPLE 137

Similar dyeings with similarly good properties on polyacrylonitrile are obtained with the dyestuff mixture of which the components have the structures

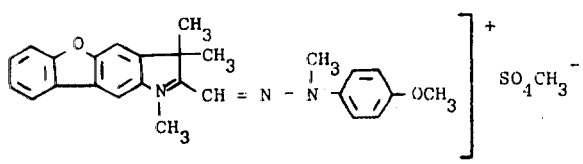

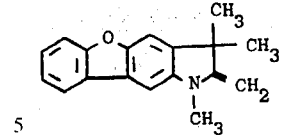 and 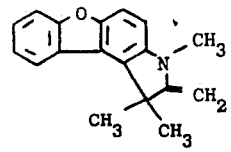

Mixture XIX and

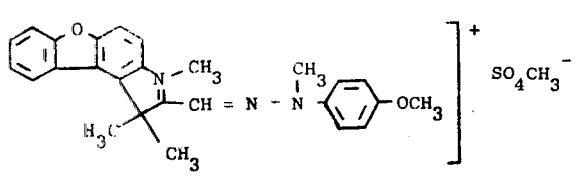

It is obtained analogously to the instructions in Example 136 if instead of the indoline mixture there the Mixture XIX is employed, of which the components have the formulae It is obtainable according to Example 227 if instead of 3-aminobenzofurane 2-aminobenzofurane is employed.

Analogously, the following valuable dyestuff mixtures are obtained when using other amines than p-anisidine for coupling to the indoline mixtures XVIII or XIX.

The colour shades indicated describe the colouration on polyacrylonitrile. The dyestuffs were redissolved in water and precipitated with sodium chloride. They are thus in the form of the chloride.

| Example No. | Indoline Mixture No. | Amine | Colour Shade on Poly-acrylonitrile |
|---|---|---|---|
| 138 | XVIII | 3-Aminophenylbenzyl-ether | golden yellow |
| 139 | " | 2-Aminophenylbenzyl-ether | reddish-tinged yellow |
| 140 | " | 4-Aminophenylbenzyl-ether | yellowish-tinged orange |
| 141 | " | 4-Aminophenyl-p-methyl-benzyl-ether | " |
| 142 | " | 4-Aminophenyl-p-chloro-benzyl-ether | " |
| 143 | " | 4-Aminophenyl-o-chloro-benzyl-ether | " |
| 144 | " | 4-Aminophenyl-m,p-dichloro-benzyl-ether | " |
| 145 | " | 3-Aminophenyl-p-methyl-benzyl-ether | golden yellow |
| 146 | " | 2-Aminophenyl-p-methyl-benzyl-ether | " |
| 147 | " | 2-Aminophenyl-p-chloro-benzyl-ether | " |
| 148 | " | 2-Aminophenyl-m,p-dichloro-benzyl-ether | |
| 149 | " | 4-Amino-2-methyl-phenyl-benzyl-ether | yellowish-tinged orange |
| 150 | " | 5-Amino-2-methyl-phenyl-benzyl-ether | " |
| 151 | " | 2-Amino-5-methyl-phenyl-benzyl-ether | golden yellow |
| 152 | " | 4-Amino-3-methoxy-phenyl-benzyl-ether | yellowish-tinged orange |
| 153 | " | 4-Amino-2-methoxy-phenyl-benzyl-ether | orange |
| 154 | " | 4-Amino-3-methyl-phenyl-benzyl-ether | yellowish-tinged orange |
| 155 | " | 4-Amino-3-chloro-phenyl-benzyl-ether | " |
| 156 | " | 4-Amino-2-chloro-phenyl-benzyl-ether | " |
| 157 | " | 4-Amino-2-methyl-phenyl-p-methyl-benzyl-ether | " |
| 158 | " | 5-Amino-2-methyl-phenyl-m,p-dichloro-benzyl-ether | " |
| 159 | " | 2-Amino-5-methyl-phenyl-p-chloro-benzyl-ether | golden yellow |
| 160 | " | 4-Amino-2-methoxy-phenyl-p-methyl-benzyl-ether | orange |
| 161 | " | 4-Aminodiphenyl-ether | yellowish-tinged orange |
| 162 | " | 2-Aminodiphenyl-ether | reddish-tinged yellow |
| 163 | " | 4-Amino-4'-methyl-diphenyl-ether | yellowish-tinged orange |
| 164 | " | 4-Amino-4'-ethyl-diphenyl-ether | " |
| 165 | " | 4-Amino-4'-tert.-butyl-diphenyl-ether | " |
| 166 | " | 4-Amino-4'-cyclohexyl-diphenyl-ether | " |
| 167 | " | 4-Amino-2'-methyl-diphenyl-ether | " |
| 168 | " | 4-Amino-3'-methyl-diphenyl-ether | " |
| 169 | " | 4-Amino-4'-methoxy-diphenyl-ether | " |
| 170 | " | 4-Amino-3'-methoxy-diphenyl-ether | " |
| 171 | " | 4-Amino-4'-ethoxy-diphenyl-ether | " |
| 172 | " | 4-Amino-4'-acetylamino-diphenyl-ether | orange |
| 173 | " | 4-Amino-4'-nitro-diphenyl-ether | " |
| 174 | " | 4-Amino-4'-chloro-diphenyl-ether | yellowish-tinged orange |
| 175 | " | 4-Amino-2'-chloro-diphenyl-ether | " |
| 176 | " | 4-Amino-3'-chloro-diphenyl-ether | " |
| 177 | " | 4-Aminophenyl-α-naphthyl-ether | " |
| 178 | " | 4-Aminophenyl-β-naphthyl-ether | " |
| 179 | " | 4-Amino-2',3',5'-trimethyl-diphenyl-ether | " |
| 180 | " | 4-Aminodiphenylmethane | " |
| 181 | " | Aniline | golden yellow |
| 182 | " | p-Toluidine | " |
| 183 | " | m-Toluidine | " |
| 184 | " | o-Anisidine | " |
| 185 | " | o-Phenetidine | " |
| 186 | " | p-Phenetidine | yellowish-tinged orange |
| 187 | " | 4-Aminoacetanilide | orange |
| 188 | " | N-Benzoyl-p-phenylenediamine | " |
| 189 | " | 2,4-Dimethoxyaniline | yellowish-tinged orange |
| 190 | " | 2,5-Dimethoxyaniline | " |
| 191 | " | 3,4-Dimethoxyaniline | reddish-tinged orange |
| 192 | " | 2-Chloro-4-aminoanisole | orange |
| 193 | " | 2,4,5-Trimethylaniline | yellowish-tinged orange |
| 194 | " | 2,3,5-Trimethylaniline | " |
| 195 | " | 5-Amino-2-acetylaminoanisole | reddish-tinged orange |
| 196 | " | 6-Amino-3-methoxytoluene | yellowish-tinged orange |
| 197 | " | 3,4-Dicyanoaniline | orange |

-Continued

| Example No. | Indoline Mixture No. | Amine | Colour Shade on Polyacrylonitrile |
|---|---|---|---|
| 198 | " | p-Sulphanilic acid amide | yellowish-tinged orange |
| 199 | " | 4-Aminobenzamide | " |
| 200 | " | 4-Chloroaniline | " |
| 201 | " | 4-Fluoroaniline | " |
| 202 | " | 1,2,3,4-Tetrahydro-5-aminonaphthalene | |
| 203 | " | 4-Amino-2,5-diethoxybenzoic acid anilide | scarlet |
| 204 | " | 4-Amino-2-methyl-5-methoxybenzanilide | orange |
| 205 | " | 4-Cyclohexylaniline | yellowish-tinged orange |
| 206 | " | 2,4-Diethoxyaniline | " |
| 207 | " | 2-Aminonaphthalene | |
| 208 | " | 3,4-Diisopropoxyaniline | scarlet |
| 209 | XIX | p-Anisidine | orange |
| 210 | " | o-Anisidine | golden yellow |
| 211 | " | p-Toluidine | " |
| 212 | " | 3,4-Dimethoxyaniline | reddish-tinged orange |
| 213 | " | 3,4-Diisopropoxyaniline | reddish-tinged orange |
| 214 | " | Aniline | golden yellow |
| 215 | " | p-tert.-Butylaniline | " |
| 216 | XVIII | " | |
| 217 | " | p-n-Butoxyaniline | orange |
| 218 | " | p-n-Propoxyaniline | " |

EXAMPLE 219

93.5 g of the dyestuff mixture described in Example 136 are dissolved in 1,500 ml of water at 98°–100°C and this solution is added dropwise over the course of 6 hours to a solution, kept at 0°C by addition of ice, of 108 g of anhydrous sodium carbonate in 680 ml of water. Thereafter the mixture is stirred for a further hour at 0°C, the product is filtered off and washed with water until chloride-free, and the yellowish, powdery product thus obtained (onium base or carbinol base) is stirred in a mixture of 200 ml of water and 19 g of lactic acid (85 percent strength) at room temperature until it has dissolved practically completely. Any small amounts of insoluble matter which may have remained are filtered off and the filtrate is evaporated at 30°C and 20 mm Hg. Residue: 83 g of orange-coloured dyestuff mixture, the components of which have the formulae

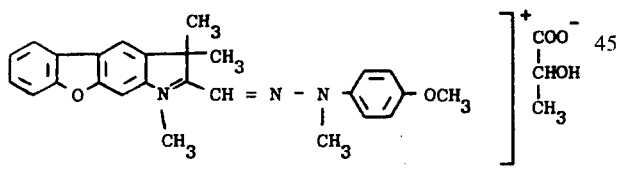

and

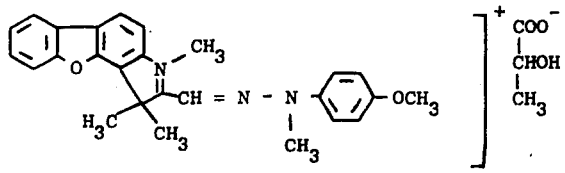

The mixture dyes polyacrylonitrile fabrics in an orange-coloured shade of excellent fastness to light.

EXAMPLE 220

13.8 parts by weight of o-nitroaniline are diazotised in a known manner. Coupling with 26.3 parts by weight of the methyleneindoline mixture No. XVIII mentioned in Example 136 gives a mixture of the dyestuffs

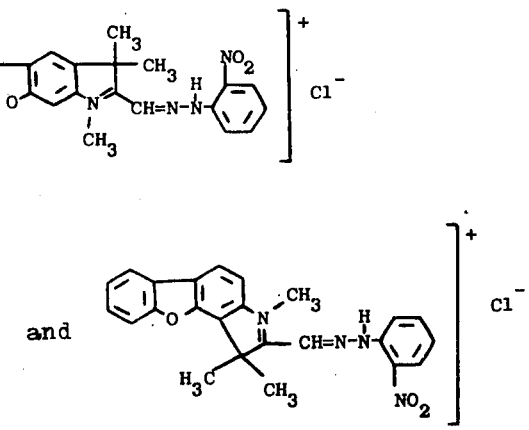

The mixture dyes polyacrylonitrile in yellow shades having good fastness properties.

EXAMPLE 221

25.8 g of 4-nitroso-3-ethoxy-diethylaniline hydrochloride, 26.3 g of the mixture No. XVIII of indolinemethylene bases, mentioned in Example 136, 70 ml of methanol, 13.6 g of zinc chloride (anhydrous) and 2.5 g of acetic anhydride are stirred for approx. 1 hour at room temperature. The mixture is introduced dropwise into 1,000 ml of 10 percent strength sodium chloride solution whilst stirring. The blue azomethine is filtered off and dried in vacuo. 32.8 g of this azomethine dyestuff are stirred with 12.8 g of N-amino-2-methylindoline sulphate in 40 ml of dimethylformamide for 2 hours at 100°. The batch is poured into a mixture of 200 ml of 10 percent strength hydrochloric acid and 200 ml of 10 percent strength sodium chloride solution. The dyestuff is filtered off and recrystallised from water. It dyes polyacrylonitrile in orange-coloured shades and consists of the components of the formulae

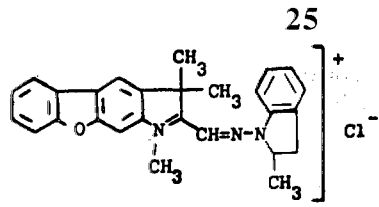

and 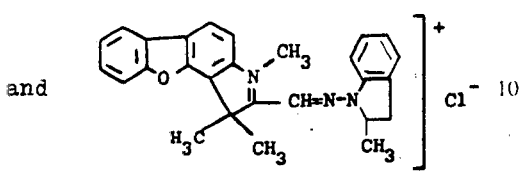

EXAMPLE 222

A polyacrylonitrile fabric is printed with a printing paste which was manufactured in the following manner: 30 parts by weight of the dyestuff mixture described in Example 1, 50 parts by weight of thiodiethylene glycol, 30 parts by weight of cyclohexanol and 30 parts by weight of 30 percent strength acetic acid are covered with 330 parts by weight of hot water and the resulting solution is added to 500 parts by weight of crystal gum (gum arabic as the thickener). Finally, 30 parts by weight of zinc nitrate solution are also added. The print obtained is dried, steamed for 30 minutes and subsequently rinsed. A yellow print of very good fastness properties is obtained.

EXAMPLE 223

Acid-modified polyglycol terephthalate fibres are introduced at 20°C, using a liquor ratio of 1:40, into an aqueous bath which per litre contains 3 to 10 g of sodium sulphate, 0.1 to 1 g of oleyl polyglycol ether (50 mols of ethylene oxide), 0–15 g of dimethyl-benzyl-dodecyl-ammonium chloride and 0.15 g of the dyestuff mixture of which the formula is described in Example 1, and which has been adjusted to pH 4–5 with acetic acid. The bath is heated to 100°C over the course of 30 minutes and is kept at this temperature for 60 minutes. Thereafter the fibres are rinsed and dried. A yellow dyeing of very good fastness properties is obtained.

EXAMPLE 224

Polyacrylonitrile fibers are introduced at 40°C, using a liquor ratio of 1:40, into an aqueous bath which per litre contains 0.75 g of 30 percent strength acetic acid, 0.38 g of sodium acetate and 0.15 g of the dyestuff mixture described in Example 1. The bath is heated to the boil over the course of 20–30 minutes and is kept at this temperature for 30–60 minutes. After rinsing and drying, a yellow dyeing having very good fastness properties is obtained.

EXAMPLE 225

A stock solution is manufactured from 15 parts by weight of the dyestuff mixture mentioned in Example 1, 15 parts by weight of polyacrylonitrile and 70 parts by weight of dimethylformamide and is added to a customary spinning solution of polyacrylonitrile, which is spun in the usual manner. A greenish-tinged yellow dyeing of the very good fastness properties is obtained.

EXAMPLE 226

Acid-modified synthetic polyamide fibres are introduced at 40°, using a liquor ratio of 1:40, into an aqueous bath which per litre contains 10 g of sodium acetate, 1 to 5 g of oleyl polyglycol ether (50 mols of ethylene oxide) and 0.3 g of the dyestuff mixture described in Example 1 and has been adjusted to pH 4–5 with acetic acid. The bath is heated to 98° over the course of 30 minutes and is kept at this temperature for 60 minutes. Thereafter the fibres were rinsed and dried. A greenish-tinged yellow dyeing of very good fastness properties is obtained.

EXAMPLE 227

The aldehyde mixture XII of the components

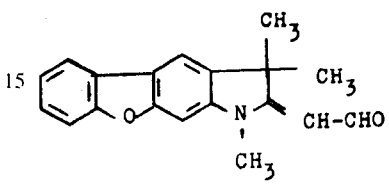

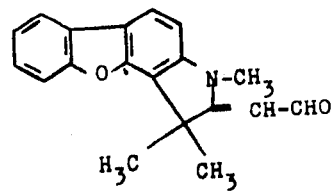

is manufactured as follows: 183 g of 3-aminodibenzofurane are diazotised and then reduced to the corresponding hydrazine in the customary manner. If the latter is reacted in a known manner (G. Plancher, B 31, page 1496) with 95 g of methyl isopropyl ketone to give the trimethylindolenine, 190 g of a yellow oil are obtained; this is not purified further but is instead immediately taken up in 300 ml of chlorobenzene, the solution is stirred at room temperature under nitrogen with 562 ml of 50 percent strength sodium hydroxide solution and 200 g of dimethyl sulphate are then added dropwise at 25° over the course of 4 hours whilst stirring vigorously.

The mixture is stirred for a further 2 hours, 1,500 ml of water are added, the whole is heated to 90° and the organic phase is separated off and washed with water. The trimethyl-2-methylene-indoline mixture thus obtained is then freed of the chlorobenzene in a water-pump vacuum.

Yield: 193 g of a yellow oil which crystallises slowly. 129 g of this mixture, of which the components have the formulae

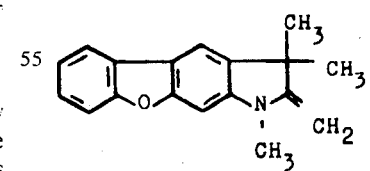

and 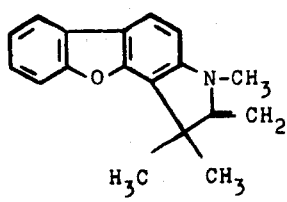

are slowly added at 40° to a mixture of 94.6 g of phosphorus oxychloride and 49 g of dimethylformamide. The resulting suspension is mixed for 8 hours at 45° and is then stirred into a mixture of 34.3 g of 45 percent strength sodium hydroxide solution and 1 kg of ice.

The whole is stirred for a further 4 hours and the resulting crystalline aldehyde mixture is filtered off. Yield: 125.6 g.

I claim:

1. Dyestuff of the formula or mixtures of dyestuffs of the formula

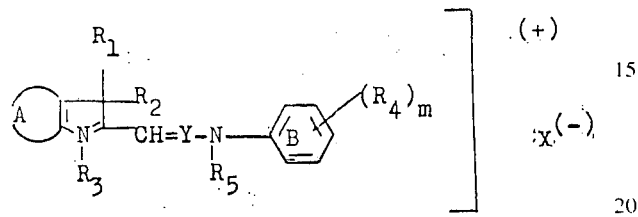

wherein

A is a dibenzofuranyl radical;

$R_1$ and $R_2$ are $C_1$-$C_6$-alkyl fluoro-$C_1$-$C_6$-alkyl, chloro-$C_1$-$C_6$-alkyl, bromo-$C_1$-$C_6$-alkyl, hydroxy-$C_1$-$C_6$-alkyl, methoxy-$C_1$-$C_6$-alkyl, cyano-$C_1$-$C_6$-alkyl, acetoxy-$C_1$-$C_6$-alkyl, or aminocarbonyl-$C_1$-$C_6$-alkyl, $C_2$-$C_6$-alkenyl, chloro-$C_2$-$C_6$-alkenyl, phenylmethyl-$C_2$-$C_6$-alkenyl, phenylethyl-$C_2$-$C_6$-alkenyl, phenylpropyl-(2,2)-$C_2$-$C_6$-alkenyl, cyclohexyl-$C_2$-$C_6$-alkenyl; or, when $R_1$ and $R_2$ are joined together, cyclohexyl;

$R_3$ is hydrogen, $C_1$-$C_6$-alkyl fluoro-$C_1$-$C_6$-alkyl, chloro-$C_1$-$C_6$-alkyl, bromo-$C_1$-$C_6$-alkyl, hydroxy-$C_1$-$C_6$-alkyl, methoxy-$C_1$-$C_6$-alkyl, cyano-$C_1$-$C_6$-alkyl acetoxy-$C_1$-$C_6$-alkyl, or aminocarbonyl-$C_1$-$C_6$-alkyl, $C_2$-$C_6$-alkenyl, chloro-$C_2$-$C_6$-alkenyl, phenyl-$C_2$-$C_6$-alkenyl, chlorophenyl-$C_2$-$C_6$-alkenyl, methylphenyl-$C_2$-$C_6$-alkenyl, naphthyl, phenylmethyl, phenylethyl, or phenylpropyl-(2,2);

$R_4$ is halo, cyano, nitro, $C_1$-$C_4$-alkyl, benzyl, phenylethyl, cyclohexyl, hydroxy, $C_1$-$C_{12}$-alkoxy, $C_1$-$C_{12}$-alkylthio, phenyloxy, phenylthio, benzyloxy, benzythio, amino, $C_1$-$C_4$-alkylamino, benzoylamino, carboxyl, ($C_1$-$C_4$-alkoxy) carbonyl, aminocarbonyl, aminosulphonyl, methylbenzyloxy, chlorobenzyloxy, naphthyloxy, N-phenylcarbamoyl, or phenyloxy substituted by $C_1$-$C_4$-alkyl, cyclohexyl, methoxy, ethoxy, acetylamino, hydroxy, nitro, or chloro, or additionally when joined to ring B naphthalene;

$R_5$ is hydrogen, $C_1$-$C_6$-alkyl fluoro-$C_1$-$C_6$-alkyl, chloro-$C_1$-$C_6$-alkyl, bromo-$C_1$-$C_6$-alkyl, hydroxy-$C_1$-$C_6$-alkenyl, methoxy-$C_1$-$C_6$-alkyl, cyano-$C_1$-$C_6$-alkyl, acetoxy-$C_1$-$C_6$-alkyl, aminocarbonyl-$C_1$-$C_6$-alkyl, $C_2$-$C_6$-alkenyl, chloro-$C_2$-$C_6$-alkenyl, cyclohexyl, phenylmethyl, phenylethyl, phenylpropyl-(2,2), or additionally when joined to ring B, dihydroindolyl, hexahydrocarbazolyl, tetrahydroquinolinyl, tetrahydroquinoxalinyl, dihydrobenzoxazinyl, or any of said heterocyclic radicals substituted by methyl;

Y is CH or N;

m is the number 0, 1 or 2; and $X^{(-)}$ is an anion.

2. Dyestuff or mixtures of dyestuffs of claim 1 of the formula

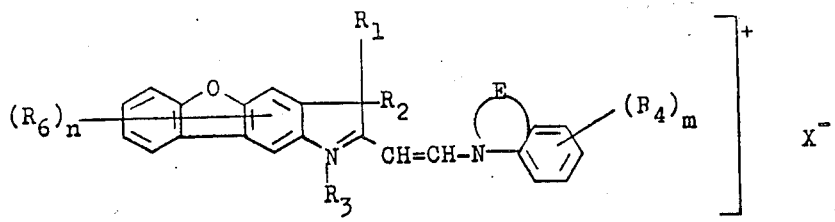

wherein $R_1$, $R_2$, $R_3$, $R_4$, m, and X are defined as in claim 1;

E is $C_2$-$C_3$-alkylene;

$R_6$ is halo, nitro, $C_1$-$C_4$-alkyl, benzyl, hydroxy, phenylethyl, $C_1$-$C_4$-alkoxy, phenyloxy, or benzyloxy; and n is the number 0, 1 or 2.

3. Dyestuff or mixtures of dyestuffs of claim 1 of the formula

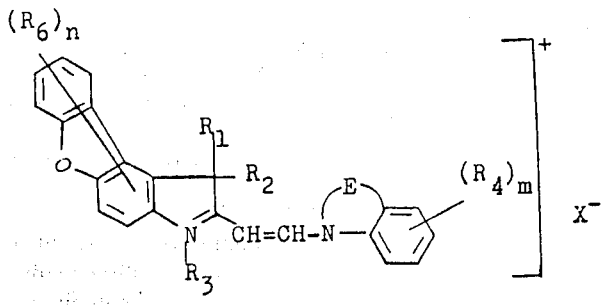

wherein

E, $R_1$, $R_2$, $R_3$, $R_4$, $R_6$, X, m and n are defined as in claim 2.

4. Dyestuff or mixtures of dyestuffs of claim 1 of the formula wherein
   E. $R_1$, $R_2$, $R_3$, $R_4$, $R_6$, X, m and n are defined as in claim 2.

5. Dyestuff or mixtures of dyestuffs of claim 1 of the formula

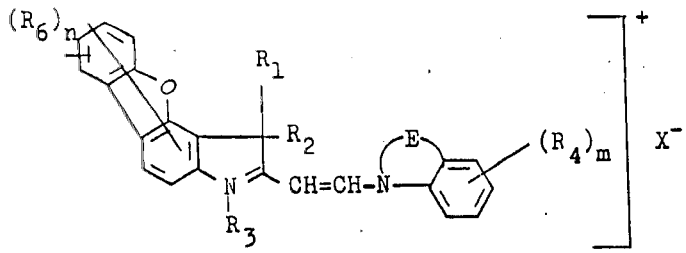

wherein
   E, $R_1$, $R_2$, $R_3$, $R_4$, $R_6$, X, m and n are defined as in claim 2.

6. Dyestuff or mixtures of dyestuffs of claim 1 of the formula

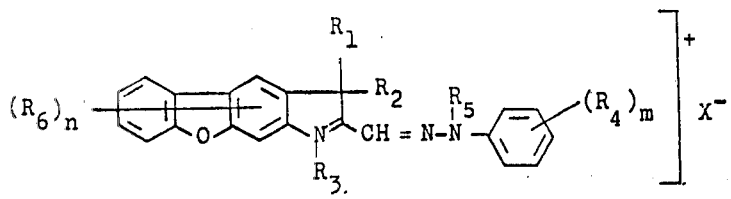

wherein
   $R_1$, $R_2$, $R_3$, $R_4$, m, and X are defined as in claim 1;
   $R_5$ is hydrogen, $C_1$-$C_4$-alkyl, benzyl or phenylethyl;
   $R_6$ is halo, nitro, $C_1$-$C_4$-alkyl, benzyl, phenylethyl, hydroxy, $C_1$-$C_4$-alkoxy, phenyloxy, or benzyloxy; and
   n is the number 0, 1 or 2.

7. Dyestuff or mixtures of dyestuffs of claim 1 of the formula

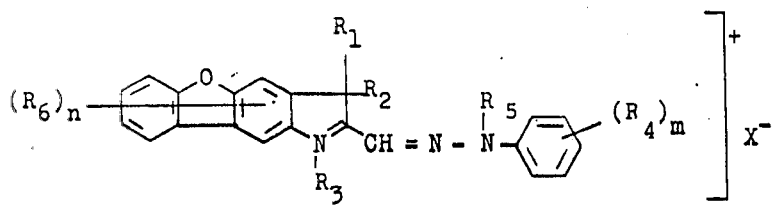

wherein
   $R_1$, $R_2$, $R_3$, $R_4$, $R_5$, $R_6$, X, m and n are defined as in claim 6.

8. Dyestuff or mixtures of dyestuffs of claim 1 of the formula

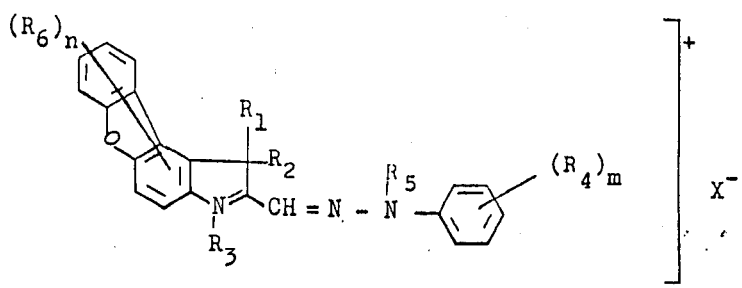

wherein
   $R_1$, $R_2$, $R_3$, $R_4$, $R_5$, $R_6$, X, m and n are defined as in claim 6.

9. Dyestuff or mixtures of dyestuffs of claim 1 of the formula

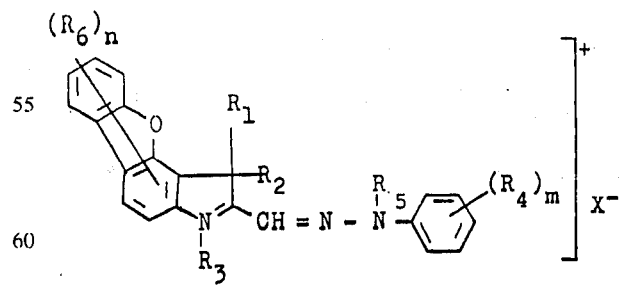

wherein
R₁, R₂, R₃, R₄, R₅, R₆, X, m and n are defined as in claim 6.
10. Mixture of the dyestuffs of the formulae
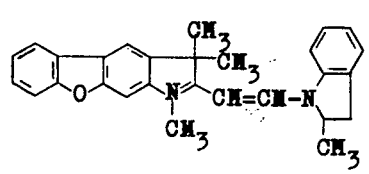
and
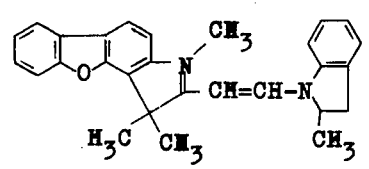
11. Mixture of the dyestuffs of the formulae
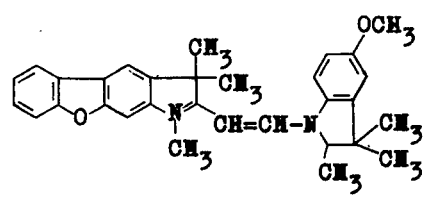
and
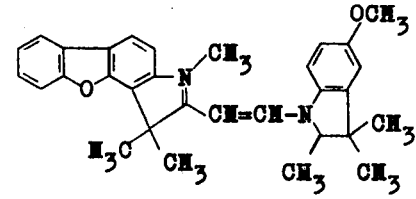
12. Mixture of the dyestuffs of the formulae
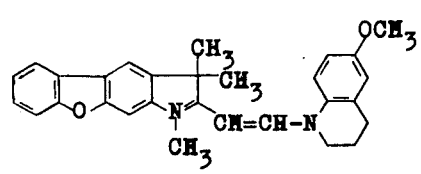
and
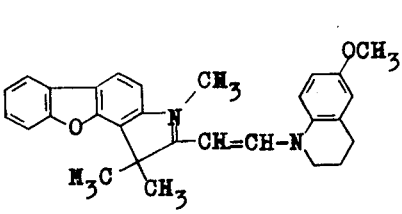
13. Mixture of the dyestuffs of the formulae
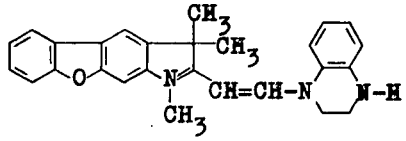
and
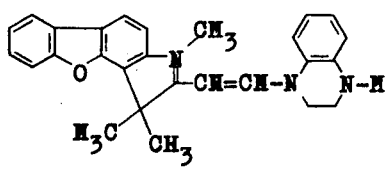
14. Mixture of the dyestuffs of the formulae
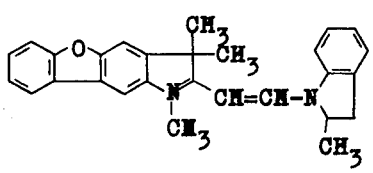
and
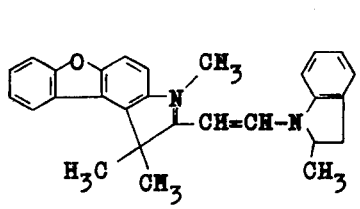
* * * * *